(12) United States Patent
Xia et al.

(10) Patent No.: US 9,749,215 B2
(45) Date of Patent: Aug. 29, 2017

(54) METHOD FOR RECEIVING INFORMATION, METHOD FOR SENDING INFORMATION, AND APPARATUS FOR THE SAME

(71) Applicant: Huawei Technologies Co., Ltd., Shenzhen, Guangdong (CN)

(72) Inventors: Yinben Xia, Shenzhen (CN); Wenxia Dong, Shenzhen (CN); Mingming Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 192 days.

(21) Appl. No.: 14/488,956

(22) Filed: Sep. 17, 2014

(65) Prior Publication Data
US 2015/0036542 A1 Feb. 5, 2015

Related U.S. Application Data

(63) Continuation of application No. PCT/CN2012/073937, filed on Apr. 12, 2012.

(51) Int. Cl.
*H04L 12/751* (2013.01)
*H04L 12/46* (2006.01)
(Continued)

(52) U.S. Cl.
CPC ............ *H04L 45/02* (2013.01); *H04L 12/462* (2013.01); *H04L 41/0695* (2013.01);
(Continued)

(58) Field of Classification Search
None
See application file for complete search history.

(56) References Cited

U.S. PATENT DOCUMENTS

| 6,130,875 A | 10/2000 | Doshi et al. |
| 2008/0189769 A1 | 8/2008 | Casado et al. |

(Continued)

FOREIGN PATENT DOCUMENTS

| CN | 102164094 A | 8/2011 |
| CN | 102301663 A | 12/2011 |

(Continued)

OTHER PUBLICATIONS

"Wire Protocol 0x01," OpenFlow Switch Specification, Version 1.0.0, pp. 1-42 (Dec. 31, 2009).
(Continued)

*Primary Examiner* — Donald Mills
(74) *Attorney, Agent, or Firm* — Leydig, Voit & Mayer, Ltd.

(57) ABSTRACT

The present invention provides a method for receiving information, a method for sending information, and apparatuses for the same. The method for receiving information includes: when a control plane apparatus is capable of managing a forwarding plane apparatus, receiving, by the forwarding plane apparatus, information used for packet forwarding path calculation sent by the control plane apparatus, where the forwarding plane apparatus and the control plane apparatus are located in a network with a network architecture featuring forwarding and control element separation. According to the technical solutions provided in embodiments of the present invention, the forwarding plane apparatus does not need to actively obtain the information used for packet forwarding path calculation before calculating a packet forwarding path based on the information used for packet forwarding path calculation.

13 Claims, 2 Drawing Sheets

When a control plane apparatus is capable of managing a forwarding plane apparatus, the forwarding plane apparatus receives information used for packet forwarding path calculation sent by the control plane apparatus, where the forwarding plane apparatus and the control plane apparatus are located in a network with a network architecture featuring forwarding and control element separation — 101

(51) Int. Cl.
　　*H04L 12/715*　　(2013.01)
　　*H04L 12/24*　　(2006.01)
　　*H04L 12/759*　　(2013.01)

(52) U.S. Cl.
　　CPC ............ *H04L 41/12* (2013.01); *H04L 45/028* (2013.01); *H04L 45/64* (2013.01)

(56) References Cited

U.S. PATENT DOCUMENTS

| | | | |
|---|---|---|---|
| 2010/0290396 A1* | 11/2010 | Karunakaran | H04L 12/467 370/328 |
| 2011/0255539 A1 | 10/2011 | Yumoto et al. | |
| 2011/0261723 A1 | 10/2011 | Yamato et al. | |
| 2011/0261825 A1 | 10/2011 | Ichino | |
| 2012/0020220 A1 | 1/2012 | Sugita | |
| 2012/0303835 A1* | 11/2012 | Kempf | H04W 24/02 709/235 |
| 2013/0028073 A1* | 1/2013 | Tatipamula | H04L 41/12 370/218 |
| 2013/0028142 A1* | 1/2013 | Beheshti-Zavareh | H04L 45/22 370/255 |
| 2013/0215769 A1* | 8/2013 | Beheshti-Zavareh | H04L 45/64 370/252 |
| 2014/0119189 A1 | 5/2014 | Lin | |

FOREIGN PATENT DOCUMENTS

| | | |
|---|---|---|
| CN | 102349268 A | 2/2012 |
| WO | WO 2010073996 A | 7/2010 |

OTHER PUBLICATIONS

"Wire Protocol 0×03," OpenFlow Switch Specification, Version 1.2 Feature-Complete, pp. 1-70 (Nov. 9, 2011).

* cited by examiner

When a control plane apparatus is capable of managing a forwarding plane apparatus, the forwarding plane apparatus receives information used for packet forwarding path calculation sent by the control plane apparatus, where the forwarding plane apparatus and the control plane apparatus are located in a network with a network architecture featuring forwarding and control element separation ~ 101

FIG. 1

When a control plane apparatus is capable of managing a forwarding plane apparatus, the control plane apparatus sends information used for packet forwarding path calculation to the forwarding plane apparatus, where the forwarding plane apparatus and the control plane apparatus are located in a network with a network architecture featuring forwarding and control element separation ~ 201

FIG. 4 ved packets according to a flow table. The control plane apparatus manages the forwarding plane apparatus by using a control channel.

METHOD FOR RECEIVING INFORMATION, METHOD FOR SENDING INFORMATION, AND APPARATUS FOR THE SAME

CROSS-REFERENCE TO RELATED APPLICATIONS

This application is a continuation of International Patent Application No. PCT/CN2012/073937, filed on Apr. 12, 2012, which is hereby incorporated by reference in its entirety.

TECHNICAL FIELD

The present invention relates to the field of network technologies, and in particular, to a method for receiving information, a method for sending information and apparatus for the same.

BACKGROUND

With the development of network technologies, a network architecture featuring forwarding and control element separation emerges, for example, OpenFlow (OpenFlow). A network with the network architecture featuring forwarding and control element separation includes two types of network devices: a forwarding plane apparatus and a control plane apparatus. The forwarding plane apparatus processes received packets according to a flow table. The control plane apparatus manages the forwarding plane apparatus by using a control channel.

"Forwarding and control element separation" means that the forwarding plane apparatus is separated from the control plane apparatus. The forwarding plane apparatus transfers partial or all control plane functions to the control plane apparatus. The forwarding plane apparatus has the capability of communicating with the control plane apparatus. The forwarding plane apparatus is capable of communicating with the control plane apparatus by using a control channel.

When the control plane apparatus is faulty or a link between the control plane apparatus and the forwarding plane apparatus fails, the control plane apparatus is incapable of managing the forwarding plane apparatus. When the control plane apparatus is incapable of managing the forwarding plane apparatus, the forwarding plane apparatus needs to actively obtain information used for packet forwarding path calculation. As a result, the forwarding plane apparatus needs to actively obtain the information used for packet forwarding path calculation before calculating a packet forwarding path based on the information used for packet forwarding path calculation.

SUMMARY

Embodiments of the present invention provide a method for receiving information, a method for sending information and apparatus for the same, which solve the technical problem that a forwarding plane apparatus needs to actively obtain information used for packet forwarding path calculation when a control plane apparatus is incapable of managing the forwarding plane apparatus.

In one aspect, an embodiment of the present invention provides a method for receiving information, including:

when a control plane apparatus is capable of managing a forwarding plane apparatus, receiving, by the forwarding plane apparatus, information used for packet forwarding path calculation sent by the control plane apparatus, where the forwarding plane apparatus and the control plane apparatus are located in a network with a network architecture featuring forwarding and control element separation.

In another aspect, an embodiment of the present invention provides a method for sending information, including:

when a control plane apparatus is capable of managing a forwarding plane apparatus, sending, by the control plane apparatus, information used for packet forwarding path calculation to the forwarding plane apparatus, where the forwarding plane apparatus and the control plane apparatus are located in a network with a network architecture featuring forwarding and control element separation.

In still another aspect, an embodiment of the present invention provides an apparatus for receiving information, including a triggering unit and a receiving unit.

The triggering unit is configured to trigger, when a control plane apparatus is capable of managing a forwarding plane apparatus, the receiving unit to receive information used for packet forwarding path calculation sent by the control plane apparatus.

The receiving unit is configured to receive the information used for packet forwarding path calculation, where the forwarding plane apparatus and the control plane apparatus are located in a network with a network architecture featuring forwarding and control element separation.

In still another aspect, an embodiment of the present invention provides an apparatus for sending information, including a triggering unit and a sending unit.

The triggering unit is configured to trigger, when a control plane apparatus is capable of managing a forwarding plane apparatus, the sending unit to send information used for packet forwarding path calculation to the forwarding plane apparatus.

The sending unit is configured to send the information used for packet forwarding path calculation, where the forwarding plane apparatus and the control plane apparatus are located in a network with a network architecture featuring forwarding and control element separation.

According to the above technical solutions, the control plane apparatus sends the information used for packet forwarding path calculation to the forwarding plane apparatus when the control plane apparatus is capable of managing the forwarding plane apparatus. Therefore, according to the technical solutions provided in embodiments of the present invention, the forwarding plane apparatus does not need to actively obtain the information used for packet forwarding path calculation before calculating a packet forwarding path based on the information used for packet forwarding path calculation.

BRIEF DESCRIPTION OF THE DRAWINGS

To make the technical solutions of embodiments of the present invention or the prior art clearer, the accompanying drawings used in the description of embodiments or the prior art are briefly described hereunder. Evidently, the accompanying drawings illustrate some exemplary embodiments of the present invention and persons of ordinary skill in the art may derive other drawings based on these drawings without creative efforts.

DESCRIPTION OF EMBODIMENTS

The technical solutions of the present invention are elaborated below with reference to accompanying drawings. Evidently, the embodiments described below are for the exemplary purpose only, without covering all embodiments of the present invention. All other embodiments, which can be derived by persons of ordinary skill in the art from the embodiments of the present invention without any creative effort, shall fall within the protection scope of the present invention.

Embodiments of the present invention relate to a network architecture featuring forwarding and control element separation. "Forwarding and control element separation" means that the forwarding plane apparatus is separated from the control plane apparatus. The forwarding plane apparatus transfers partial or all control plane functions to the control plane apparatus. The forwarding plane apparatus has the capability of communicating with the control plane apparatus. The forwarding plane apparatus is capable of communicating with the control plane apparatus by using a control channel.

The control plane apparatus involved in the present invention is an apparatus compliant with a network architecture featuring forwarding and control element separation. The forwarding plane apparatus involved in the present invention is an apparatus compliant with a network architecture featuring forwarding and control element separation. The forwarding plane apparatus processes received packets according to a flow table. The control plane apparatus controls the forwarding plane apparatus by using a control channel.

For example, during packet forwarding, the forwarding plane apparatus may forward Layer 2 packets or Layer 3 packets. For Layer 2 and Layer 3, reference may be made to the open systems interconnection model (Open Systems Interconnection model, OSI model).

In the specific implementation, the forwarding plane apparatus may be a switch or a router.

In the scenario where the forwarding plane apparatus is a switch, the forwarding plane apparatus may specifically be an OpenFlow switch (OpenFlow Switch). For the OpenFlow switch, reference may be made to OpenFlow Switch Specification 1.0 (OpenFlow Switch Specification 1.0) released by the Standard Setting Organization (Standard Setting Organization, SSO) Open Networking Foundation (Open Networking Foundation, ONF).

In the specific implementation, the control plane apparatus may be an OpenFlow controller (OpenFlow Controller). For the OpenFlow controller, reference may be made to OpenFlow Switch Specification 1.0.

In a specific implementation, the control channel may be a secure channel (Secure Channel) used for interaction between the OpenFlow switch and the OpenFlow controller. For the secure channel, reference may be made to OpenFlow Switch Specification 1.0 released by ONF.

The forwarding plane apparatus may support two forwarding modes: flow forwarding mode and packet forwarding mode.

Flow forwarding means that the forwarding plane apparatus forwards packets according to the flow table. The number of fields in a flow entry for judging whether a packet matches the flow entry is two or more. For example, the number of fields in a flow entry for judging whether a packet matches the flow entry may be five. The five fields may be source Internet Protocol (Internet Protocol, IP) address, destination IP address, source port (Port), destination port and protocol (Protocol) respectively. For example, the fields that are used to judge whether a packet matches the flow entry may be fields at the data link (Data Link) layer or IP layer of the OSI model.

Packet forwarding means that the forwarding plane apparatus forwards packets according to the packet forwarding table. The number of fields in a packet forwarding entry for judging whether a packet matches the packet forwarding entry is 1. For example, the field that is used to judge whether a packet matches the flow entry may be the destination IP address or the destination Media Access Control (Media Access Control, MAC) protocol address. Persons skilled in the art may understand that the packet forwarding table may be a MAC table or a routing table.

Persons skilled in the art may understand that an OpenFlow switch may generate a MAC table according to the source MAC address in the received packets and the interface used for receiving packets. After the MAC table is generated, the OpenFlow switch may forward packets according to the MAC table.

Figure 1:
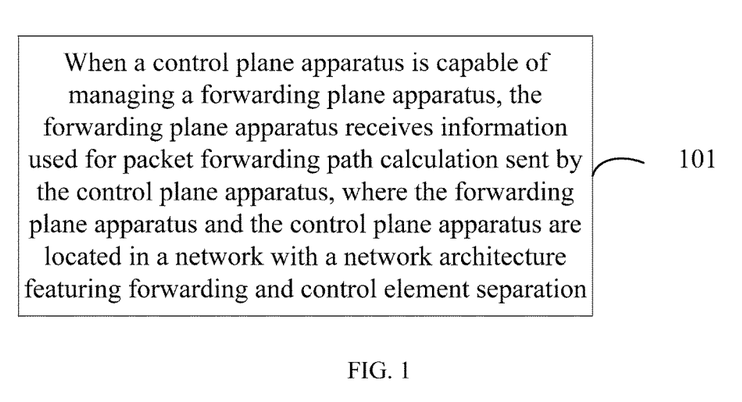
FIG. 1 is a flowchart of a method for receiving information according to an embodiment of the present invention.

FIG. 1 is a flowchart of a method for receiving information according to an embodiment of the present invention. As shown in FIG. 1, the method includes:

101. When a control plane apparatus is capable of managing a forwarding plane apparatus, the forwarding plane apparatus receives information used for packet forwarding path calculation sent by the control plane apparatus, where the forwarding plane apparatus and the control plane apparatus are located in a network with a network architecture featuring forwarding and control element separation.

The fact that the control plane apparatus is capable of managing the forwarding plane apparatus means that the control plane apparatus is capable of communicating with the forwarding plane apparatus by using a control channel.

According to the above technical solutions, the control plane apparatus sends the information used for packet forwarding path calculation to the forwarding plane apparatus when the control plane apparatus is capable of managing the forwarding plane apparatus. Therefore, according to the technical solutions provided in embodiments of the present invention, the forwarding plane apparatus does not need to actively obtain the information used for packet forwarding path calculation before calculating a packet forwarding path based on the information used for packet forwarding path calculation.

Optionally, the forwarding plane apparatus, after receiving the information used for packet forwarding path calculation, may calculate a packet forwarding path based on the information used for packet forwarding path calculation.

For example, the forwarding plane apparatus may calculate the packet forwarding path according to the Spanning Tree Protocol (Spanning Tree Protocol, STP). The forwarding plane apparatus may also calculate the packet forwarding path according to the Intermediate System to Intermediate System (Intermediate System to Intermediate System, IS-IS) protocol.

For example, when an OpenFlow switch calculates the forwarding path according to STP, the used algorithm may be a Bellman-Ford algorithm, a Dijkstra algorithm, a Floyd-Warshall algorithm, or a Johnson algorithm. When the forwarding plane apparatus calculates the packet forwarding path according to STP, the packet forwarding path may be indicated by the following information: a root bridge identifier, a root interface identifier, and a designated interface identifier.

For example, when the OpenFlow switch calculates the forwarding path according to the IS-IS protocol, the used algorithm may be a Shortest Path First (Shortest Path First, SPF) algorithm.

Optionally, the receiving, by the forwarding plane apparatus, the information used for packet forwarding path calculation sent by the control plane apparatus includes:

receiving, by the forwarding plane apparatus, the information used for packet forwarding path calculation, where the information used for packet forwarding path calculation is obtained in the following ways:

obtaining, by the control plane apparatus, the network topology information; and generating, by the control plane apparatus, the information used for packet forwarding path calculation based on the network topology information.

The network topology information includes the local and remote interfaces by using which one of any two directly-connected network elements is connected to the other network element. For example, the control plane apparatus obtains the network topology information by running the extended Link Layer Discovery Protocol (Link Layer Discovery Protocol, LLDP).

For example, after a Transfer Control Protocol (Transfer Control Protocol, TCP) connection is established between the OpenFlow controller and the managed OpenFlow switch, the OpenFlow controller is capable of knowing the interfaces on the managed OpenFlow switch. The OpenFlow controller sends an extended LLDP message to the managed OpenFlow switch. The extended LLDP message carries the identifier and the interface identifier of the managed OpenFlow switch.

When the managed OpenFlow switch has multiple interfaces, the OpenFlow controller sends multiple extended LLDP messages to the managed OpenFlow switch. The multiple extended LLDP messages correspond one-to-one to the multiple interfaces. Each of the multiple extended LLDP messages carries the interface identifier of the corresponding interface. After receiving an extended LLDP message, the managed OpenFlow switch forwards, by using the interface of the managed OpenFlow switch, the extended LLDP message corresponding to the interface to a neighbor OpenFlow switch. After receiving the extended LLDP message, the neighbor OpenFlow switch adds its identifier to the extended LLDP message to generate a new extended LLDP message. The neighbor OpenFlow switch sends the new extended LLDP message to the OpenFlow controller by using a control channel.

Based on the above mechanism, the OpenFlow controller is capable of knowing the interface used by the OpenFlow switch to connect to the neighbor OpenFlow switch from the new extended LLDP message.

Based on the same mechanism, the OpenFlow controller is capable of further knowing the interface used by the neighbor OpenFlow switch to connect to its neighbor OpenFlow switch.

By repeating the above operations, the OpenFlow controller is capable of obtaining the topology information of the managed network.

Optionally, the information used for packet forwarding path calculation includes the identifier of the root bridge.

For example, after obtaining the topology information of the managed network, the OpenFlow controller may obtain the identifier of the root bridge by running STP. Persons skilled in the art may understand that when OpenFlow switches are of the same priority, the MAC protocol address value of the root bridge is smaller than the MAC protocol address values of other OpenFlow switches managed by the same OpenFlow controller.

For example, after obtaining the topology information of the managed network, the OpenFlow controller may obtain the identifier of the root bridge by running STP. After receiving the root bridge identifier sent by the OpenFlow controller, the OpenFlow switch may obtain the link cost (Cost) by running STP. The OpenFlow switch may obtain the identifiers of a root interface, a non-root and non-designated interface, and a designated interface according to the root bridge identifier and the link cost by running STP.

Optionally, the information used for packet forwarding path calculation may further include a root path cost (Root Path Cost).

For example, after a TCP connection is established between the OpenFlow switch and the OpenFlow controller, the OpenFlow switch uses the OpenFlow protocol to send the bandwidth of each interface of the OpenFlow switch to the OpenFlow controller. For the OpenFlow protocol, reference may be made to OpenFlow Switch Specification 1.0 released by ONF. The OpenFlow controller is capable of obtaining the interface cost according to the interface bandwidth. The OpenFlow switch is directly connected to a neighbor OpenFlow switch by using a first interface. The bandwidth of the first interface is equal to the cost of the direct link from the OpenFlow switch to the neighbor OpenFlow switch.

When the OpenFlow switch is not directly connected to the root bridge, and there are multiple links between the OpenFlow switch and the root bridge, the OpenFlow controller may calculate the costs of the multiple links respectively to obtain multiple root path costs. The cost of the link from the OpenFlow switch to the root bridge is the root path cost.

For example, after obtaining the topology information of the managed network, the OpenFlow controller may obtain the identifier of the root bridge by running STP. After receiving the root bridge identifier and the root path cost sent by the OpenFlow controller, the OpenFlow switch may obtain the identifiers of the root interface, the designated interface, and the non-root and non-designated interface by running STP.

Persons skilled in the art may understand that after STP is run on an OpenFlow network, which interface or interfaces of an OpenFlow switch with multiple interfaces have loops may be determined according to the root bridge and the network topology information. When a loop exists, the OpenFlow network is capable of determining which interface or interfaces are the root interface or the non-root and non-designated interfaces according to the cost of the link from the root bridge to the OpenFlow switch.

Persons skilled in the art may understand that the process of determining whether an interface of the OpenFlow switch is a root interface, a designated interface, or a non-root and non-designated interface belongs to the packet forwarding path calculation process.

Optionally, the receiving, by the forwarding plane apparatus, the information used for packet forwarding path calculation sent by the control plane apparatus includes:

receiving, by the forwarding plane apparatus, the information used for packet forwarding path calculation, where the information used for packet forwarding path calculation is obtained in the following ways:

obtaining, by the control plane apparatus, the network topology information, where the network topology information is the information used for packet forwarding path calculation.

For example, the control plane apparatus may obtain the network topology information based on the extended LLDP.

Optionally, the information used for packet forwarding path calculation includes the link state database (Link State Database, LSDB).

Optionally, the information used for forwarding path calculation may be stored in the forwarding plane apparatus.

Optionally, when the control plane apparatus is incapable of managing the forwarding plane apparatus, the forwarding plane apparatus calculates a forwarding path according to the information used for forwarding path calculation.

For example, the control plane apparatus is incapable of managing the forwarding plane apparatus because of faults on the control plane apparatus or link failures between the control plane apparatus and the forwarding plane apparatus.

Figure 2:
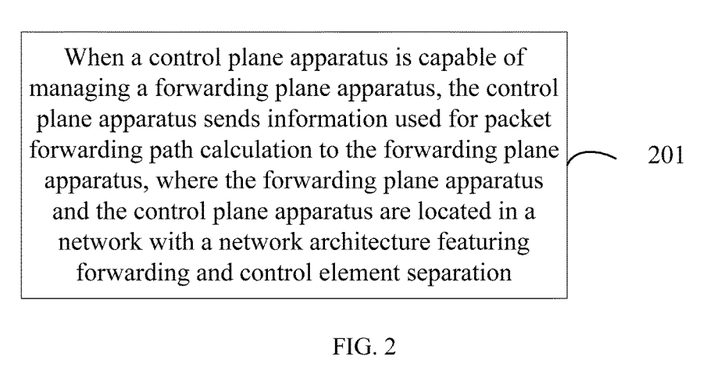
FIG. 2 is a flowchart of a method for sending information according to an embodiment of the present invention.

FIG. 2 is a flowchart of a method for sending information according to an embodiment of the present invention. As shown in FIG. 2, the method includes:

201. When a control plane apparatus is capable of managing a forwarding plane apparatus, the control plane apparatus sends information used for packet forwarding path calculation to the forwarding plane apparatus, where the forwarding plane apparatus and control plane apparatus are located in a network with a network architecture featuring forwarding and control element separation.

The fact that the control plane apparatus is capable of managing the forwarding plane apparatus means that the control plane apparatus is capable of communicating with the forwarding plane apparatus by using a control channel.

According to the above technical solutions, the control plane apparatus sends the information used for packet forwarding path calculation to the forwarding plane apparatus when the control plane apparatus is capable of managing the forwarding plane apparatus. Therefore, according to the technical solutions provided in embodiments of the present invention, the forwarding plane apparatus does not need to actively obtain the information used for packet forwarding path calculation before calculating a packet forwarding path based on the information used for packet forwarding path calculation.

Optionally, the forwarding plane apparatus, after receiving the information used for packet forwarding path calculation, may calculate a packet forwarding path based on the information used for packet forwarding path calculation.

For example, the forwarding plane apparatus may calculate a packet forwarding path according to STP. The forwarding plane apparatus may also calculate a packet forwarding path according to the IS-IS protocol.

For example, when an OpenFlow switch calculates the forwarding path according to STP, the used algorithm may be a Bellman-Ford algorithm, a Dijkstra algorithm, a Floyd-Warshall algorithm, or a Johnson algorithm. When the forwarding plane apparatus calculates the packet forwarding path according to STP, the packet forwarding path may be indicated by the following information: a root bridge identifier, a root interface identifier, and a designated interface identifier.

For example, when the OpenFlow switch calculates the forwarding path according to the IS-IS protocol, the used algorithm may be a SPF algorithm.

Optionally, before the control plane apparatus sends the information used for packet forwarding path calculation to the forwarding plane apparatus, the method includes:

obtaining, by the control plane apparatus, the network topology information; and generating, by the control plane apparatus, the information used for packet forwarding path calculation based on the network topology information.

The network topology information includes the local and remote interfaces by using which one of any two directly-connected network elements is connected to the other network element. For example, the control plane apparatus obtains the network topology information by running the extended LLDP.

For example, after a TCP connection is established between the OpenFlow controller and the managed OpenFlow switch, the OpenFlow controller may know the interfaces on the managed OpenFlow switch. The OpenFlow controller sends an extended LLDP message to the managed OpenFlow switch. The extended LLDP message carries the identifier and the interface identifier of the managed OpenFlow switch.

When the managed OpenFlow switch has multiple interfaces, the OpenFlow controller sends multiple extended LLDP messages to the managed OpenFlow switch. The multiple extended LLDP messages correspond one-to-one to the multiple interfaces. Each of the multiple extended LLDP messages carries the interface identifier of the corresponding interface. After receiving an extended LLDP message, the managed OpenFlow switch forwards, by using the interface of the managed OpenFlow switch, the extended LLDP message corresponding to the interface to a neighbor OpenFlow switch. After receiving the extended LLDP message, the neighbor OpenFlow switch adds its identifier to the extended LLDP message to generate a new extended LLDP message. The neighbor OpenFlow switch sends the new extended LLDP message to the OpenFlow controller by using a control channel.

Based on the above mechanism, the OpenFlow controller is capable of knowing the interface used by the OpenFlow switch to connect to the neighbor OpenFlow switch from the new extended LLDP message.

Based on the same mechanism, the OpenFlow controller may further obtain the interface used by the neighbor OpenFlow switch to connect to its neighbor OpenFlow switch.

By repeating the above operations, the OpenFlow controller is capable of obtaining the topology information of the managed network.

Optionally, the information used for packet forwarding path calculation includes the identifier of the root bridge.

For example, after obtaining the topology information of the managed network, the OpenFlow controller may obtain the identifier of the root bridge by running STP. Persons skilled in the art may understand that when OpenFlow switches are of the same priority, the MAC protocol address value of the root bridge is smaller than the MAC protocol address values of other OpenFlow switches managed by the same OpenFlow controller.

For example, after obtaining the topology information of the managed network, the OpenFlow controller may obtain the identifier of the root bridge by running STP. After receiving the root bridge identifier sent by the OpenFlow controller, the OpenFlow switch can run STP to obtain the link cost. The OpenFlow switch may obtain the identifiers of a root interface, a non-root and non-designated interface, and a designated interface according to the root bridge identifier and the link cost by running STP.

Optionally, the information used for packet forwarding path calculation may further include the root path cost.

For example, after a TCP connection is established between the OpenFlow switch and the OpenFlow controller, the OpenFlow switch uses the OpenFlow protocol to send the bandwidth of each interface of the OpenFlow switch to the OpenFlow controller. For the OpenFlow protocol, reference may be made to OpenFlow Switch Specification 1.0 released by ONF. The OpenFlow controller is capable of obtaining the interface cost according to the interface bandwidth. The OpenFlow switch is directly connected to a neighbor OpenFlow switch by using a first interface. The bandwidth of the first interface is equal to the cost of the direct link from the OpenFlow switch to the neighbor OpenFlow switch.

When the OpenFlow switch is not directly connected to the root bridge, and there are multiple links between the OpenFlow switch and the root bridge, the OpenFlow controller may calculate the costs of the multiple links respectively to obtain multiple root path costs. The cost of the link from the OpenFlow switch to the root bridge is the root path cost.

For example, after obtaining the topology information of the managed network, the OpenFlow controller may obtain the identifier of the root bridge by running STP. After receiving the root bridge identifier and the root path cost sent by the OpenFlow controller, the OpenFlow switch may obtain the identifiers of the root interface, the designated interface, and the non-root and non-designated interface by running STP.

Persons skilled in the art may understand that after STP is run on an OpenFlow network, which interface or interfaces of an OpenFlow switch with multiple interfaces have loops may be determined according to the root bridge and the network topology information. When a loop exists, the OpenFlow network is capable of determining which interface or interfaces are the root interface or the non-root and non-designated interfaces according to the cost of the link from the root bridge to the OpenFlow switch.

Persons skilled in the art may understand that the process of determining whether an interface of the OpenFlow switch is a root interface, a designated interface, or a non-root and non-designated interface belongs to the packet forwarding path calculation process.

Optionally, before the control plane apparatus sends the information used for packet forwarding path calculation to the forwarding plane apparatus, the method includes:

obtaining, by the control plane apparatus, the network topology information, where the network topology information is the information used for packet forwarding path calculation.

For example, the control plane apparatus may obtain the network topology information based on the extended LLDP.

Optionally, the information used for packet forwarding path calculation includes the LSDB.

Optionally, when the control plane apparatus is incapable of managing the forwarding plane apparatus, the forwarding plane apparatus calculates a forwarding path according to the information used for forwarding path calculation.

For example, the control plane apparatus is incapable of managing the forwarding plane apparatus because of faults on the control plane apparatus or link failures between the control plane apparatus and the forwarding plane apparatus.

Figure 3:
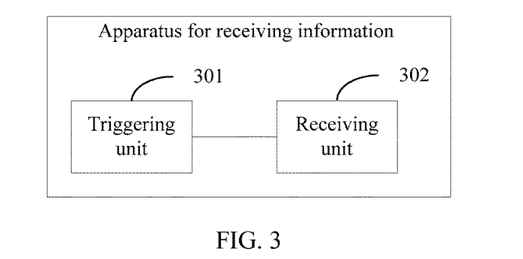
FIG. 3 is a schematic structural diagram of an apparatus for receiving information according to an embodiment of the present invention.

FIG. 3 is a schematic structural diagram of an apparatus for receiving information according to an embodiment of the present invention. The apparatus shown in FIG. 3 may be implemented by using the method shown in FIG. 1. The apparatus is a forwarding plane apparatus. As shown in FIG. 3, the apparatus includes a triggering unit 301 and a receiving unit 302.

The triggering unit 301 is configured to trigger, when a control plane apparatus is capable of managing the forwarding plane apparatus, the receiving unit 302 to receive information used for packet forwarding path calculation sent by the control plane apparatus.

The receiving unit 302 is configured to receive the information used for packet forwarding path calculation, where the forwarding plane apparatus and the control plane apparatus are located in a network with a network architecture featuring forwarding and control element separation.

The fact that the control plane apparatus is capable of managing the forwarding plane apparatus means that the control plane apparatus is capable of communicating with the forwarding plane apparatus by using a control channel.

According to the above technical solutions, the control plane apparatus sends the information used for packet forwarding path calculation to the forwarding plane apparatus when the control plane apparatus is capable of managing the forwarding plane apparatus. Therefore, according to the technical solutions provided in embodiments of the present invention, the forwarding plane apparatus does not need to actively obtain the information used for packet forwarding path calculation before calculating a packet forwarding path based on the information used for packet forwarding path calculation.

Optionally, the apparatus may further include a calculating unit, configured to calculate the packet forwarding path according to the information used for packet forwarding path calculation received by the receiving unit 302.

For example, the forwarding plane apparatus may calculate the packet forwarding path according to STP. The forwarding plane apparatus may also calculate the packet forwarding path according to the IS-IS protocol.

For example, when an OpenFlow switch calculates the forwarding path according to STP, the used algorithm may be a Bellman-Ford algorithm, a Dijkstra algorithm, a Floyd-Warshall algorithm, or a Johnson algorithm. When the forwarding plane apparatus calculates the packet forwarding path according to STP, the packet forwarding path may be indicated by the following information: a root bridge identifier, a root interface identifier, and a designated interface identifier.

For example, when the OpenFlow switch calculates the forwarding path according to the IS-IS protocol, the used algorithm may be a SPF algorithm.

Optionally, the receiving unit 302 is configured to receive the information used for packet forwarding path calculation, where the information used for packet forwarding path calculation may be obtained in the following ways:

obtaining, by the control plane apparatus, the network topology information; and generating, by the control plane apparatus, the information used for packet forwarding path calculation based on the network topology information.

The network topology information includes the local and remote interfaces by using which one of any two directly-connected network elements is connected to the other network element. For example, the control plane apparatus obtains the network topology information by running the extended LLDP.

For example, after a TCP connection is established between the OpenFlow controller and the managed OpenFlow switch, the OpenFlow controller is capable of knowing the interfaces on the managed OpenFlow switch. The OpenFlow controller sends an extended LLDP message to the managed OpenFlow switch. The extended LLDP message carries the identifier and the interface identifier of the managed OpenFlow switch.

When the managed OpenFlow switch has multiple interfaces, the OpenFlow controller sends multiple extended LLDP messages to the managed OpenFlow switch. The multiple extended LLDP messages correspond one-to-one to the multiple interfaces. Each of the multiple extended LLDP messages carries the interface identifier of the corresponding interface. After receiving an extended LLDP message, the managed OpenFlow switch forwards, by using the interface of the managed OpenFlow switch, the extended LLDP message corresponding to the interface to a neighbor OpenFlow switch. After receiving the extended LLDP message, the neighbor OpenFlow switch adds its identifier to the extended LLDP message to generate a new extended LLDP message. The neighbor OpenFlow switch sends the new extended LLDP message to the OpenFlow controller by using a control channel.

Based on the above mechanism, the OpenFlow controller is capable of knowing the interface used by the OpenFlow switch to connect to the neighbor OpenFlow switch from the new extended LLDP message.

Based on the same mechanism, the OpenFlow controller may further obtain the interface used by the neighbor OpenFlow switch to connect to its neighbor OpenFlow switch.

By repeating the above operations, the OpenFlow controller is capable of obtaining the topology information of the managed network.

Optionally, the information used for packet forwarding path calculation includes the identifier of the root bridge.

For example, after obtaining the topology information of the managed network, the OpenFlow controller may obtain the identifier of the root bridge by running STP. Persons skilled in the art may understand that when OpenFlow switches are of the same priority, the MAC protocol address value of the root bridge is smaller than the MAC protocol address values of other OpenFlow switches managed by the same OpenFlow controller.

For example, after obtaining the topology information of the managed network, the OpenFlow controller may obtain the identifier of the root bridge by running STP. After receiving the root bridge identifier sent by the OpenFlow controller, the OpenFlow switch can run STP to obtain the link cost. The OpenFlow switch may obtain the identifiers of a root interface, a non-root and non-designated interface, and a designated interface according to the root bridge identifier and the link cost by running STP.

Optionally, the information used for packet forwarding path calculation may further include the root path cost.

For example, after a TCP connection is established between the OpenFlow switch and the OpenFlow controller, the OpenFlow switch uses the OpenFlow protocol to send the bandwidth of each interface of the OpenFlow switch to the OpenFlow controller. For the OpenFlow protocol, reference may be made to OpenFlow Switch Specification 1.0 released by ONF. The OpenFlow controller is capable of obtaining the interface cost according to the interface bandwidth. The OpenFlow switch is directly connected to a neighbor OpenFlow switch by using a first interface. The bandwidth of the first interface is equal to the cost of the direct link from the OpenFlow switch to the neighbor OpenFlow switch.

When the OpenFlow switch is not directly connected to the root bridge, and there are multiple links between the OpenFlow switch and the root bridge, the OpenFlow controller may calculate the costs of the multiple links respectively to obtain multiple root path costs. The cost of the link from the OpenFlow switch to the root bridge is the root path cost.

For example, after obtaining the topology information of the managed network, the OpenFlow controller may obtain the identifier of the root bridge by running STP. After receiving the root bridge identifier and the root path cost sent by the OpenFlow controller, the OpenFlow switch may obtain the identifiers of the root interface, the designated interface, and the non-root and non-designated interface by running STP.

Persons skilled in the art may understand that after STP is run on an OpenFlow network, which interface or interfaces of an OpenFlow switch with multiple interfaces have loops may be determined according to the root bridge and the network topology information. When a loop exists, the OpenFlow network is capable of determining which interface or interfaces are the root interface or the non-root and non-designated interfaces according to the cost of the link from the root bridge to the OpenFlow switch.

Persons skilled in the art may understand that the process of determining whether an interface of the OpenFlow switch is a root interface, a designated interface, or a non-root and non-designated interface belongs to the packet forwarding path calculation process.

Optionally, the receiving unit 302 is configured to receive the information used for packet forwarding path calculation, where the information used for packet forwarding path calculation is obtained in the following ways:

obtaining, by the control plane apparatus, the network topology information, where the network topology information is the information used for packet forwarding path calculation.

For example, the control plane apparatus may obtain the network topology information based on the extended LLDP.

Optionally, the information used for packet forwarding path calculation includes the LSDB.

Optionally, the apparatus may include a storage unit, configured to store the information used for forwarding path calculation.

Optionally, the calculating unit is configured to calculate, when the control plane apparatus is incapable of managing the forwarding plane apparatus, a forwarding path according to the information used for forwarding path calculation.

For example, the control plane apparatus is incapable of managing the forwarding plane apparatus because of faults on the control plane apparatus or link failures between the control plane apparatus and the forwarding plane apparatus.

Figure 4:
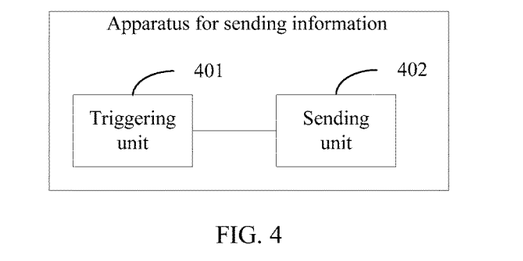
FIG. 4 is a schematic structural diagram of an apparatus for sending information according to an embodiment of the present invention.

FIG. 4 is a schematic structural diagram of an apparatus for sending information according to an embodiment of the present invention. The apparatus shown in FIG. 4 may be implemented by using the method shown in FIG. 2. The apparatus is a control plane apparatus. As shown in FIG. 4, the apparatus includes a triggering unit 401 and a sending unit 402.

The triggering unit 401 is configured to trigger, when the control plane apparatus is capable of managing a forwarding plane apparatus, the sending unit 402 to send information used for packet forwarding path calculation to the forwarding plane apparatus.

The sending unit 402 is configured to send the information used for packet forwarding path calculation, where the forwarding plane apparatus and the control plane apparatus are located in a network with a network architecture featuring forwarding and control element separation.

The fact that the control plane apparatus is capable of managing the forwarding plane apparatus means that the control plane apparatus is capable of communicating with the forwarding plane apparatus by using a control channel.

According to the above technical solutions, the control plane apparatus sends the information used for packet forwarding path calculation to the forwarding plane apparatus when the control plane apparatus is capable of managing the forwarding plane apparatus. Therefore, according to the technical solutions provided in embodiments of the present invention, the forwarding plane apparatus does not need to actively obtain the information used for packet forwarding path calculation before calculating a packet forwarding path based on the information used for packet forwarding path calculation.

Optionally, the forwarding plane apparatus, after receiving the information used for packet forwarding path calculation, may calculate a packet forwarding path based on the information used for packet forwarding path calculation.

For example, the forwarding plane apparatus may calculate a packet forwarding path according to STP. The forwarding plane apparatus may also calculate a packet forwarding path according to the IS-IS protocol.

For example, when an OpenFlow switch calculates the forwarding path according to STP, the used algorithm may be a Bellman-Ford algorithm, a Dijkstra algorithm, a Floyd-Warshall algorithm, or a Johnson algorithm. When the forwarding plane apparatus calculates the packet forwarding path according to STP, the packet forwarding path may be indicated by the following information: a root bridge identifier, a root interface identifier, and a designated interface identifier.

For example, when the OpenFlow switch calculates the forwarding path according to the IS-IS protocol, the used algorithm may be a SPF algorithm.

Optionally, the apparatus may further include:

a first generating unit, configured to obtain, before the sending unit 402 sends the information used for packet forwarding path calculation, the network topology information, and generate the information used for packet forwarding path calculation based on the network topology information.

The network topology information includes the local and remote interfaces by using which one of any two directly-connected network elements is connected to the other network element. For example, the control plane apparatus obtains the network topology information by running the extended LLDP.

For example, after a TCP connection is established between the OpenFlow controller and the managed OpenFlow switch, the OpenFlow controller may know the interfaces on the managed OpenFlow switch. The OpenFlow controller sends an extended LLDP message to the managed OpenFlow switch. The extended LLDP message carries the identifier and the interface identifier of the managed OpenFlow switch.

When the managed OpenFlow switch has multiple interfaces, the OpenFlow controller sends multiple extended LLDP messages to the managed OpenFlow switch. The multiple extended LLDP messages correspond one-to-one to the multiple interfaces. Each of the multiple extended LLDP messages carries the interface identifier of the corresponding interface. After receiving an extended LLDP message, the managed OpenFlow switch forwards, by using the interface of the managed OpenFlow switch, the extended LLDP message corresponding to the interface to a neighbor OpenFlow switch. After receiving the extended LLDP message, the neighbor OpenFlow switch adds its identifier to the extended LLDP message to generate a new extended LLDP message. The neighbor OpenFlow switch sends the new extended LLDP message to the OpenFlow controller by using a control channel.

Based on the above mechanism, the OpenFlow controller is capable of knowing the interface used by the OpenFlow switch to connect to the neighbor OpenFlow switch from the new extended LLDP message.

Based on the same mechanism, the OpenFlow controller may further obtain the interface used by the neighbor OpenFlow switch to connect to its neighbor OpenFlow switch.

By repeating the above operations, the OpenFlow controller is capable of obtaining the topology information of the managed network.

Optionally, the information used for packet forwarding path calculation includes the identifier of the root bridge.

For example, after obtaining the topology information of the managed network, the OpenFlow controller may obtain the identifier of the root bridge by running STP. Persons skilled in the art may understand that when OpenFlow switches are of the same priority, the MAC address protocol value of the root bridge is smaller than the MAC protocol address values of other OpenFlow switches managed by the same OpenFlow controller.

For example, after obtaining the topology information of the managed network, the OpenFlow controller may obtain the identifier of the root bridge by running STP. After receiving the root bridge identifier sent by the OpenFlow controller, the OpenFlow switch can run STP to obtain the link cost. The OpenFlow switch may obtain the identifiers of a root interface, a non-root and non-designated interface, and a designated interface according to the root bridge identifier and the link cost by running STP.

Optionally, the information used for packet forwarding path calculation may also include the root path cost.

For example, after a TCP connection is established between the OpenFlow switch and the OpenFlow controller, the OpenFlow switch uses the OpenFlow protocol to send the bandwidth of each interface of the OpenFlow switch to the OpenFlow controller. For the OpenFlow protocol, reference may be made to OpenFlow Switch Specification 1.0 released by ONF. The OpenFlow controller is capable of obtaining the interface cost according to the interface bandwidth. The OpenFlow switch is directly connected to a neighbor OpenFlow switch by using a first interface. The bandwidth of the first interface is equal to cost of the direct link from the OpenFlow switch to the neighbor OpenFlow switch.

When the OpenFlow switch is not directly connected to the root bridge, and there are multiple links between the OpenFlow switch and the root bridge, the OpenFlow controller may calculate costs of the multiple links respectively to obtain multiple root path costs. The cost of the link from the OpenFlow switch to the root bridge is the root path cost.

For example, after obtaining the topology information of the managed network, the OpenFlow controller may obtain the identifier of the root bridge by running STP. After receiving the root bridge identifier and the root path cost sent by the OpenFlow controller, the OpenFlow switch may obtain the identifiers of the root interface, the designated interface, and the non-root and non-designated interface by running STP.

Persons skilled in the art may understand that after STP is run on an OpenFlow network, which interface or interfaces of an OpenFlow switch with multiple interfaces have loops may be determined according to the root bridge and the network topology information. When a loop exists, the OpenFlow network is capable of determining which interface or interfaces are the root interface or the non-root and non-designated interfaces according to the cost of the link from the root bridge to the OpenFlow switch.

Persons skilled in the art may understand that the process of determining whether an interface of the OpenFlow switch is a root interface, a designated interface, or a non-root and non-designated interface belongs to the packet forwarding path calculation process.

Optionally, a second generating unit, configured to obtain, before the sending unit 402 sends the information used for packet forwarding path calculation, the network topology information, where the network topology information is the information used for packet forwarding path calculation.

For example, the control plane apparatus may obtain the network topology information based on the extended LLDP.

Optionally, the information used for packet forwarding path calculation includes the LSDB.

Optionally, when the control plane apparatus is incapable of managing the forwarding plane apparatus, the forwarding plane apparatus calculates a forwarding path according to the information used for forwarding path calculation.

For example, the control plane apparatus is incapable of managing the forwarding plane apparatus because of faults on the control plane apparatus or link failures between the control plane apparatus and the forwarding plane apparatus.

Persons of ordinary skill in the art may know that the various exemplary units and algorithm steps described in conjunction with the embodiments disclosed herein can be implemented by electronic hardware, or a combination of computer software and electronic hardware. Whether the functions are executed by hardware or software depends on particular applications and design constraint conditions of the technical solutions. A person skilled in the art may use different methods to implement the described functions for each specific application. However, such implementation should not be considered as going beyond the scope of the present invention.

It can be clearly understood by persons skilled in the art that, for the purpose of convenient and brief description, for a detailed working process of the foregoing system, apparatus and unit, reference may be made to the corresponding process in the method embodiments, and the details will not be described herein again.

In the embodiments provided in the present application, it should be understood that the disclosed system, apparatus and method may be implemented in other modes. For example, the described apparatus embodiments are merely exemplary. For example, the unit division is merely logical function division and can be other division in actual implementation. For example, multiple units or components can be combined or integrated into another system, or some features can be ignored or not performed. In addition, the displayed or discussed mutual couplings or direct couplings or communication connections may be implemented by using some interfaces. The indirect couplings or communication connections between the apparatuses or units may be implemented in electrical, mechanical or other forms.

The units described as separate parts may or may not be physically separate, and parts displayed as units may or may not be physical units, which may be located in one position, or may be distributed on multiple network elements. A part or all of the units may be selected according to the actual needs to achieve the objectives of the solutions of the embodiments.

In addition, function units in the embodiments of the present invention may be integrated into a processing unit, or each of the units may exist alone physically, or two or more units are integrated into a unit.

When being implemented in the form of a software function unit and sold or used as a stand-alone product, the functions may be stored in a computer-readable storage medium. Based on such understanding, the essence of the technical solutions of the present invention, or the part that makes contributions to the prior art, or the part of the technical solution may be embodied in the form of a software product. The computer software product may be stored in a storage medium, and incorporates several instructions for instructing a computer (for example, a personal computer, a server, or a network device, etc.) to execute all or part of the steps of the method in any embodiment of the present invention. The storage medium includes: any medium that can store program code, such as a U-disk, a removable hard disk, a read-only memory (ROM, Read-Only Memory), a random access memory (RAM, Random Access Memory), a magnetic disk, or a CD-ROM, etc.

The above descriptions are merely preferred embodiments of the present invention, but not intended to limit the protection scope of the present invention. Any variations or replacement that can be easily derived by those skilled in the art without departing from the scope of the present invention shall fall within the protection scope of the present invention. Therefore, the protection scope of the present invention is subject to the appended claims.

What is claimed is:

1. A method for receiving information in a network with a network architecture featuring forwarding and control element separation, the method comprising:
   determining, by a forwarding plane apparatus, whether a control plane apparatus is capable of managing the forwarding plane apparatus;

upon determining, by the forwarding plane apparatus, that the control plane apparatus is capable of managing the forwarding plane apparatus, receiving, by the forwarding plane apparatus, information sent by the control plane apparatus and comprising packet forwarding path calculation input information, wherein the information comprising packet forwarding path calculation input information is obtained by the control plane apparatus according to topology information of the network; and upon determining, by the forwarding plane apparatus, that the control plane apparatus is incapable of managing the forwarding plane apparatus, calculating, by the forwarding plane apparatus, a packet forwarding path according to the information comprising packet forwarding path calculation input information.

2. The method according to claim 1, wherein receiving, by the forwarding plane apparatus, information sent by the control plane apparatus and comprising packet forwarding path calculation input information comprises:
obtaining the information comprising packet forwarding path calculation input information by the following:
obtaining, by the control plane apparatus, the topology information of the network; and
generating, by the control plane apparatus, the information comprising packet forwarding path calculation input information based on the topology information of the network.

3. The method according to claim 2, wherein the information comprising packet forwarding path calculation input information comprises an identifier of a root bridge.

4. The method according to claim 1, wherein receiving, by the forwarding plane apparatus, information sent by the control plane apparatus and comprising packet forwarding path calculation input information comprises:
obtaining the information comprising packet forwarding path calculation input information by the following:
obtaining, by the control plane apparatus, the topology information of the network, wherein the topology information of the network is the information comprising packet forwarding path calculation input information.

5. The method according to claim 4, wherein the information comprising packet forwarding path calculation input information comprises a link state database.

6. A method for sending information in a network with a network architecture featuring forwarding and control element separation, the method comprising:
sending, by a control plane apparatus, capable of managing a forwarding plane apparatus to the forwarding plane apparatus, information comprising packet forwarding path calculation input information, to enable the forwarding plane apparatus to calculate a packet forwarding path according to the information comprising packet forwarding path calculation input information, wherein the information comprising packet forwarding path calculation input information is obtained by the control plane apparatus according to topology information of the network.

7. The method according to claim 6, wherein before the control plane apparatus sends the information comprising packet forwarding path calculation input information to the forwarding plane apparatus, the method further comprises:
obtaining, by the control plane apparatus, the topology information of the network; and
generating, by the control plane apparatus, the information comprising packet forwarding path calculation input information based on the topology information of the network.

8. The method according to claim 7, wherein the information comprising packet forwarding path calculation input information comprises an identifier of a root bridge.

9. The method according to claim 6, wherein before the control plane apparatus sends the information comprising packet forwarding path calculation input information to the forwarding plane apparatus, the method further comprises:
obtaining, by the control plane apparatus, the topology information of the network, wherein the topology information of the network is the information comprising packet forwarding path calculation input information.

10. The method according to claim 9, wherein the information comprising packet forwarding path calculation input information comprises a link state database.

11. A control plane apparatus, comprising a processor and a non-transitory processor-readable medium including computer-executable instructions executed by the computing hardware to perform, on the control plane apparatus, operations comprising:
triggering a sending of information comprising packet forwarding path calculation input information to a forwarding plane apparatus, wherein the control plane apparatus is capable of managing the forwarding plane apparatus and the information comprising packet forwarding path calculation input information is obtained by the control plane apparatus according to topology information of a network; and
sending the information comprising packet forwarding path calculation input information to the forwarding plane apparatus, to enable the forwarding plane apparatus to calculate a packet forwarding path according to the information comprising packet forwarding path calculation input information;
wherein the forwarding plane apparatus and the control plane apparatus are located in a network with a network architecture featuring forwarding and control element separation.

12. The control plane apparatus according to claim 11, wherein the operations further comprise:
before sending the information comprising packet forwarding path calculation input information, obtaining the topology information of the network and generating the information comprising packet forwarding path calculation input information based on the topology information of the network.

13. The control plane apparatus according to claim 11, wherein the operations further comprise:
before sending the information comprising packet forwarding path calculation input information, obtaining the topology information of the network, wherein the topology information of the network is the information comprising packet forwarding path calculation input information.

* * * * *